US010797620B2

(12) United States Patent
Furukawa et al.

(10) Patent No.: US 10,797,620 B2
(45) Date of Patent: Oct. 6, 2020

(54) ROTATING MACHINE CONTROL DEVICE AND ELECTRIC POWER STEERING CONTROL DEVICE

(71) Applicant: Mitsubishi Electric Corporation, Tokyo (JP)

(72) Inventors: Akira Furukawa, Tokyo (JP); Munenori Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/319,019

(22) PCT Filed: Aug. 24, 2016

(86) PCT No.: PCT/JP2016/074686
§ 371 (c)(1),
(2) Date: Jan. 18, 2019

(87) PCT Pub. No.: WO2018/037506
PCT Pub. Date: Mar. 1, 2018

(65) Prior Publication Data
US 2019/0280629 A1    Sep. 12, 2019

(51) Int. Cl.
*H02P 5/00*    (2016.01)
*H02P 5/46*    (2006.01)
(Continued)

(52) U.S. Cl.
CPC .............. *H02P 5/46* (2013.01); *B62D 5/046* (2013.01); *B62D 5/0481* (2013.01); *B62D 6/00* (2013.01);
(Continued)

(58) Field of Classification Search
CPC ........ B62D 5/046; B62D 5/0481; B62D 6/00; H02P 21/06; H02P 21/22; H02P 25/16;
(Continued)

(56) References Cited

U.S. PATENT DOCUMENTS

2002/0057015 A1    5/2002 Kikuta et al.
2011/0264326 A1*  10/2011 Iwasaki .................. B62D 5/046
                                                                        701/41
(Continued)

FOREIGN PATENT DOCUMENTS

JP           3511593 B2      3/2004
JP      2012-153355 A        8/2012
(Continued)

OTHER PUBLICATIONS

The Extended European Search Report dated Jul. 10, 2019, issued by the European Patent Office in corresponding application No. 16914180.1, in English.
(Continued)

*Primary Examiner* — Eduardo Colon Santana
*Assistant Examiner* — Gabriel Agared
(74) *Attorney, Agent, or Firm* — Sughrue Mion, PLLC; Richard C. Turner

(57) ABSTRACT

A control unit includes: control command generation means for generating a first control command and a second control command that specifies currents to flow through a first winding set and second winding set respectively; voltage calculation means for calculating a first voltage command from the first control command and calculating a second voltage command from the second control command; and first voltage application means and second voltage application means for applying voltages to the first winding set and the second winding set of a rotating machine on the basis of (Continued)

the first voltage command and the second voltage command, wherein discharge control for electric charge of a smoothing capacitor is performed while torque generated by current flowing from the smoothing capacitor to the first winding set and torque generated by current flowing from the capacitor to the second winding set are cancelled out with each other.

25 Claims, 10 Drawing Sheets

(51) Int. Cl.
*H02P 21/22* (2016.01)
*B62D 5/04* (2006.01)
*B62D 6/00* (2006.01)
*H02P 6/08* (2016.01)
*H02P 21/06* (2016.01)
*H02P 25/22* (2006.01)
*H02P 6/00* (2016.01)
*H02P 25/16* (2006.01)

(52) U.S. Cl.
CPC .............. *H02P 6/00* (2013.01); *H02P 6/08* (2013.01); *H02P 21/06* (2013.01); *H02P 21/22* (2016.02); *H02P 25/16* (2013.01); *H02P 25/22* (2013.01)

(58) Field of Classification Search
CPC .... H02P 25/22; H02P 5/46; H02P 6/00; H02P 6/08
USPC .......................................................... 318/34
See application file for complete search history.

(56) References Cited

U.S. PATENT DOCUMENTS

| | | | | |
|---|---|---|---|---|
| 2011/0272205 | A1* | 11/2011 | Fujimoto | ............... B62D 5/046 180/446 |
| 2013/0049663 | A1* | 2/2013 | Amano | ................. B60L 3/0007 318/453 |
| 2014/0136055 | A1* | 5/2014 | Sugiyama | .............. B62D 5/046 701/42 |
| 2016/0089990 | A1* | 3/2016 | Nishimura | .......... B60L 11/1803 701/22 |
| 2017/0297612 | A1* | 10/2017 | Uryu | ......................... H02P 6/28 |

FOREIGN PATENT DOCUMENTS

| | | |
|---|---|---|
| JP | 2012-228115 A | 11/2012 |
| JP | 2013-51755 A | 3/2013 |
| JP | 2016-67148 A | 4/2016 |

OTHER PUBLICATIONS

International Search Report for PCT/JP2016/074686 dated Nov. 22, 2016 (PCT/ISA/210).

* cited by examiner

| PHASE DIFFERENCE | Vu2 | Vv2 | Vw2 |
|---|---|---|---|
| 0 | -Va | 0 | Va |
| π/3 | -Va | Va | 0 |
| 2π/3 | 0 | Va | -Va |
| π | Va | 0 | -Va |
| 4π/3 | Va | -Va | 0 |
| 5π/3 | 0 | -Va | Va |

| PHASE DIFFERENCE | Vu2 | Vv2 | Vw2 |
|---|---|---|---|
| $\pi/6$ | $-2Va/\sqrt{3}$ | $Va/\sqrt{3}$ | $Va/\sqrt{3}$ |
| $\pi/2$ | $-Va/\sqrt{3}$ | $2Va/\sqrt{3}$ | $-Va/\sqrt{3}$ |
| $5\pi/6$ | $Va/\sqrt{3}$ | $Va/\sqrt{3}$ | $-2Va/\sqrt{3}$ |
| $7\pi/6$ | $2Va/\sqrt{3}$ | $-Va/\sqrt{3}$ | $-Va/\sqrt{3}$ |
| $3\pi/2$ | $Va/\sqrt{3}$ | $-2Va/\sqrt{3}$ | $Va/\sqrt{3}$ |
| $11\pi/6$ | $-Va/\sqrt{3}$ | $-Va/\sqrt{3}$ | $2Va/\sqrt{3}$ |

ROTATING MACHINE CONTROL DEVICE AND ELECTRIC POWER STEERING CONTROL DEVICE

CROSS REFERENCE TO RELATED APPLICATIONS

This application is a National Stage of International Application No. PCT/JP2016/074686 filed Aug. 24, 2016, the disclosure of which is incorporated herein in its entirety by reference.

TECHNICAL FIELD

The present invention relates to a control device for a rotating machine, and an electric power steering control device.

BACKGROUND ART

Some of electric power steering control devices are provided with a smoothing capacitor for reducing variation in voltage at the time of driving a rotating machine. The smoothing capacitor is gradually charged with electric charge. Therefore, it is necessary to discharge the electric charge charged in the smoothing capacitor, at the time of detecting welding of a power supply relay using voltage of a load-side contact. One conventional electric power steering control device includes a discharge circuit for discharging a smoothing capacitor in order to shorten a time period required for welding detection (see, for example, Patent Document 1). In another example, a current command value on q axis (torque component) in an orthogonal rotating two-axis coordinate system (d-q coordinate system) is set to 0 and a current command value on d axis (magnetic field component) is set to a predetermined value, thereby performing discharging of a smoothing capacitor without using a discharge circuit as shown in Patent Document 1 (see, for example, Patent Document 2).

CITATION LIST

Patent Document

Patent Document 1: Japanese Patent No. 3511593 (FIG. 1)
Patent Document 2: Japanese Laid-Open Patent Publication No. 2012-153355 (FIG. 4)

SUMMARY OF THE INVENTION

Problems to be Solved by the Invention

Electric power steering control devices in these days include two sets of inverter circuits, but the control device size thereof is required to be equal to a conventional size. However, mounting a discharge circuit as in Patent Document 1 increases the size of the control device and leads to cost increase. In Patent Document 2, a rotation angle fixed for performing electric discharge control is used in conversion to a d-q coordinate system and in reverse conversion from a d-q coordinate system. Therefore, if there is a 0-order angle error between the fixed rotation angle and an actual rotation angle, there is a possibility that torque exceeding loss torque occurs due to d-axis current, thereby rotating a steering wheel, and if there is an angle error of first order or higher, there is a possibility that torque ripple occurs. In order to prevent these, it is conceivable to reduce the absolute value of d-axis current. However, this causes a problem of elongating a discharge period.

The present invention has been made to solve the above problem, and an object of the present invention is to obtain a control device for a rotating machine, and an electric power steering control device, that are capable of discharging a smoothing capacitor within a short time while preventing size increase of the entire device.

Solution to the Problems

A control device for a rotating electric machine according to the present invention is a control device for a rotating machine having a stator including a first winding set and a second winding set, the control device including: a relay for supplying or interrupting current from a DC power supply; a capacitor for suppressing variation in current supplied from the DC power supply; control command generation means for generating a first control command that specifies current to flow through the first winding set, and a second control command that specifies current to flow through the second winding set; voltage calculation means for calculating a first voltage command from the first control command and calculating a second voltage command from the second control command; first voltage application means for applying voltage to the first winding set on the basis of the first voltage command; and second voltage application means for applying voltage to the second winding set on the basis of the second voltage command, wherein electric discharge control for electric charge of the capacitor is performed while torque generated by current flowing from the capacitor to the first winding set and torque generated by current flowing from the capacitor to the second winding set are cancelled out with each other.

Effect of the Invention

In the control device for the rotating electric machine according to the present invention, electric charge of the capacitor is caused to flow to the first winding set and the second winding set of the rotating machine and electric discharge control for the capacitor is performed while torque occurring in the first winding and torque occurring in the second winding are cancelled out with each other. Therefore, a discharge circuit is not needed, and it is possible to cause larger electric discharge current to flow in order to prevent rotation of the steering wheel or the like. Thus, it is possible to discharge the smoothing capacitor within a short time while preventing size increase of the device.

DESCRIPTION OF EMBODIMENTS

Embodiment 1

Hereinafter, embodiment 1 of the present invention will be described with reference to FIG. 1 to FIG. 3.

Figure 1:
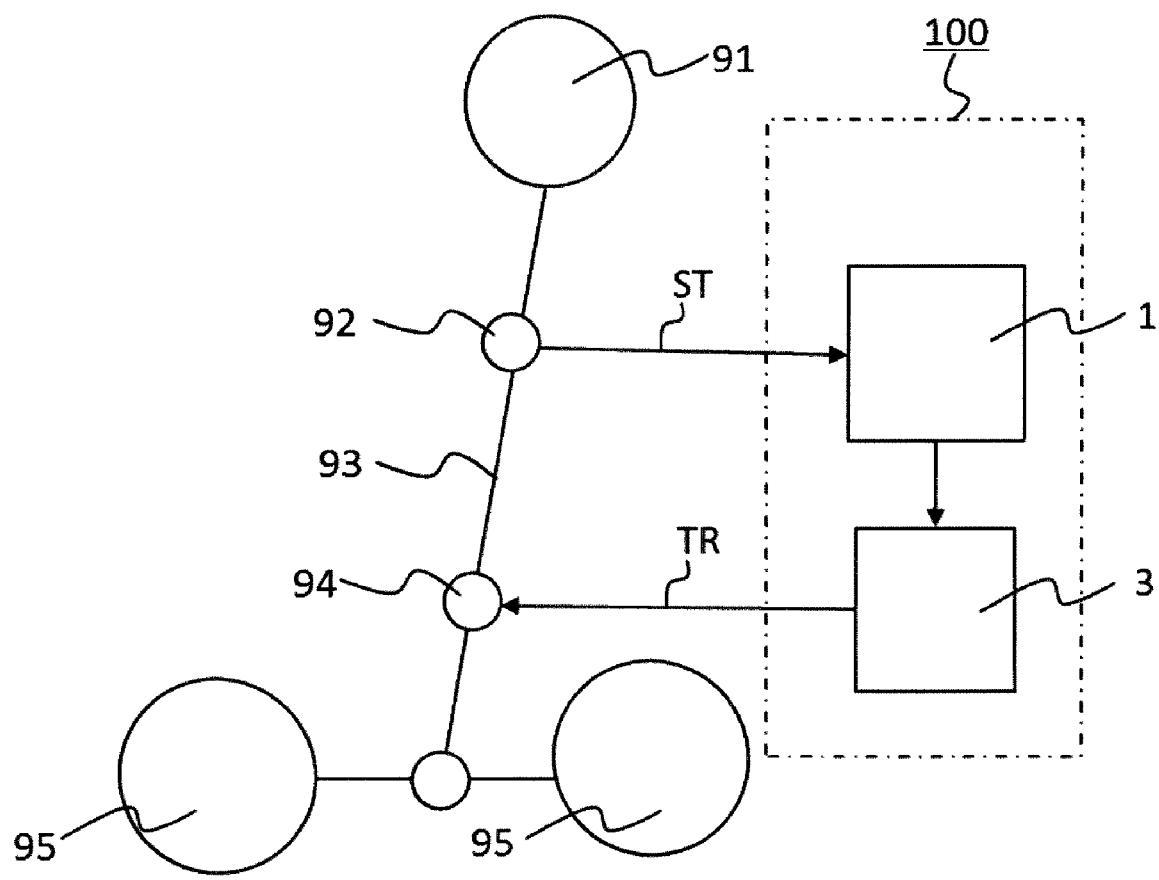
FIG. 1 is a schematic configuration diagram showing an electric power steering control device including a control device for a rotating machine of the present invention.
Figure 2:
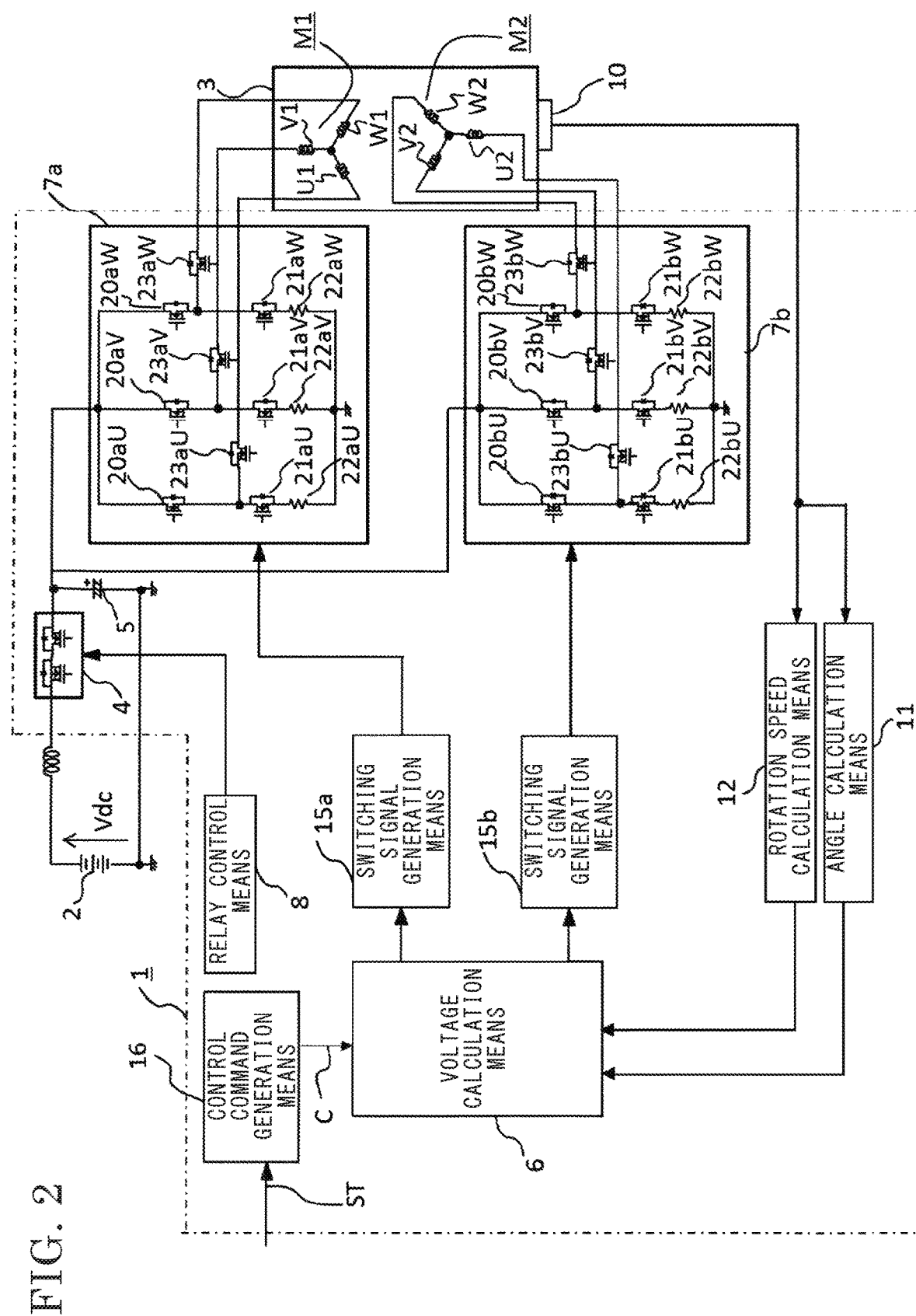
FIG. 2 is an entire configuration diagram showing a control device for a rotating machine according to embodiment 1 of the present invention.

FIG. 1 is a schematic configuration diagram showing an electric power steering control device including a control device for a rotating machine of the present invention. FIG. 2 is an entire configuration diagram showing a control device for a rotating machine according to embodiment 1. As shown in FIG. 1, the electric power steering control device 100 includes a control unit 1, i.e., a control device for a rotating machine, and a rotating machine 3. When a driver generates steering torque to a steering mechanism of a vehicle by a steering wheel 91, torque detection means 92 detects steering torque given to the steering wheel shaft 93 and transmits a torque detection signal ST to the control unit 1. The control unit 1 acquires steering torque from the torque detection signal ST and performs rotation control of the rotating machine 3 in accordance with the steering torque, to generate assist torque TR. The assist torque TR is transmitted onto the steering wheel shaft 93 via a gear 94, and then supplied to a steering mechanism for front wheels 95 of the vehicle. Although the gear 94 is used here, the assist torque TR may be transmitted using a chain.

The control unit 1 converts power outputted from a DC power supply 2, to AC power by first voltage application means 7a and second voltage application means 7b, to rotationally drive the rotating machine 3. The rotating machine 3 includes: a first winding set M1 composed of a winding U1, a winding V1, and a winding W1 respectively corresponding to three phases of U phase, V phase, and W phase; and a second winding set M2 composed of a winding U2, winding V2, and winding W2 respectively corresponding to the three phases. In each winding set, the phases thereof are connected by star connection. These two winding sets form a stator (not shown), and the rotating machine 3 is composed of the stator (not shown), a rotor (not shown), and a rotary shaft (not shown) fixed to the rotor. In the following description, the case where the present invention is applied to a permanent-magnet-type synchronous AC rotating machine which has winding sets for three phases and in which permanent magnets are arranged in the rotor, will be described as an example. However, the present invention can be used for rotating machines that are rotationally driven with multi-phase AC. Therefore, an induction machine or a magnetic-field-winding-type synchronous machine may be used. Although the phases of each winding set are connected by star connection in the present embodiment, delta connection may be employed.

In the control unit 1, the DC power supply 2 outputs DC voltage Vdc to the first voltage application means 7a and the second voltage application means 7b. The DC power supply 2 may be any device that outputs DC voltage, such as a battery, a DC-DC converter, a diode rectifier, and a PWM rectifier.

A relay 4 is connected between the DC power supply 2 and a smoothing capacitor 5, and is controlled by relay control means 8 so as to supply or interrupt power to the first voltage application means 7a and the second voltage application means 7b. The smoothing capacitor 5 is connected in parallel to the DC power supply 2 and suppresses variation in bus current, thereby achieving stable DC current.

Control command generation means 16 receives a torque detection signal ST during normal operation of the electric power steering, and generates a control command C for causing the rotating machine 3 to generate assist torque TR according to steering torque. During execution of later-described discharge control, i.e., electric discharge control, the control command generation means 16 generates a control command C for suppressing occurrence of torque of the rotating machine 3 and causing copper loss. The control command C is composed of a first control command for controlling current flowing through the first winding set M1 and a second control command for controlling current flowing through the second winding set M2. Although described later in detail, the first control command and the second control command in the present embodiment are current commands in a rotating two-axis system.

The voltage calculation means 6 calculates voltage commands for driving the rotating machine 3 on the basis of the control command C received from the control command generation means 16. Here, first voltage commands Vu1, Vv1, Vw1 are calculated from the first control command and outputted to first switching signal generation means 15a, and second voltage commands Vu2, Vv2, Vw2 are calculated from the second control command and outputted to second switching signal generation means 15b. The first voltage commands Vu1, Vv1, Vw1 are voltage commands for the windings U1, V1, W1 composing the first winding set M1. The second voltage commands Vu2, Vv2, Vw2 are voltage commands for the windings U2, V2, W2 composing the second winding set M2.

As a calculation method for each voltage control command, feedforward control such as V/F control, or feedback control such as proportional integral control based on a deviation between a current command for each winding and current flowing through the winding, may be used. In the V/F control, the amplitude of each voltage command is determined while an angular velocity (frequency) command f for the rotating machine 3 has been set. In the proportional integral control, a current command for determining current to flow through the rotating machine 3 is set as the control command C, a deviation between a current command value for each winding and current flowing through the winding is acquired, and a voltage command corresponding to each winding is calculated so as to cause each deviation to be zero. Current flowing through each winding is detected using known current detection means such as a shunt resistor, for example. In the proportional integral control, the first voltage commands Vu1, Vv1, Vw1 are calculated on the basis of deviations between current commands for the first winding set M1 and currents Iu1, Iv1, Iw1 flowing through the windings U1, V1, W1. The second voltage commands Vu2, Vv2, Vw2 are calculated on the basis of deviations between current commands for the second winding set M2 and currents Iu2, Iv2, Iw2 flowing through the windings U2, V2, W2.

It is noted that, in the proportional integral control which is feedback control, it is necessary to input current flowing through each winding, to the voltage calculation means 6, but in the V/F control which is feedforward control, control is performed using an estimated value, and therefore it is not necessary to input current flowing through each winding, to the voltage calculation means 6.

The first switching signal generation means 15a performs pulse width modulation (PWM modulation) on the basis of the first voltage commands Vu1, Vv1, Vw1 outputted from the voltage calculation means 6, thereby outputting first switching signals Qup1, Qun1, Qvp1, . . . , Qwn1 having pulse widths according to the first voltage commands Vu1, Vv1, Vw1. Similarly, the second switching signal generation means 15b performs pulse width modulation (PWM modulation) on the basis of the second voltage commands Vu2, Vv2, Vw2 outputted from the voltage calculation means 6, thereby outputting second switching signals Qup2, Qun2, Qvp2, . . . , Qwn2 having pulse widths according to the second voltage commands Vu2, Vv2, Vw2. It is noted that, needless to say, the first switching signals Qup1, Qvp1, Qwp1 and Qun1, Qvn1, Qwn1 and the second switching signals Qup2, Qvp2, Qwp2 and Qun2, Qvn2, Qwn2 may be generated after the first voltage commands Vu1, Vv1, Vw1 and the second voltage commands Vu2, Vv2, Vw2 are modulated using a known modulation method such as spatial vector modulation or two-phase modulation.

In the first voltage application means 7a, switching elements 20aU, 20aV, 20aW of upper arms and switching elements 21aU, 21aV, 21aW of lower arms are turned on or off on the basis of the first switching signals Qup1, Qvp1, Qwp1 and Qun1, Qvn1, Qwn1, whereby DC voltage inputted from the DC power supply 2 or the smoothing capacitor 5 is subjected to power conversion and the resultant voltages are applied to the windings U1, V1, W1 of the first winding set M1 of the rotating machine 3. In addition, the first voltage application means 7a includes, for the respective phases, current detection resistors 22aU, 22aV, 22aW, and relays 23aU, 23aV, 23aW for supplying or interrupting voltages to the rotating machine 3.

In the second voltage application means 7b, switching elements 20bU, 20bV, 20bW of upper arms and switching elements 21bU, 21bV, 21bW of lower arms are turned on or off on the basis of the second switching signals Qup2, Qvp2, Qwp2 and Qun2, Qvn2, Qwn2, whereby DC voltage inputted from the DC power supply 2 or the smoothing capacitor 5 are subjected to power conversion and the resultant voltages are applied to the windings U2, V2, W2 of the second winding set M2 of the rotating machine 3. In addition, the second voltage application means 7b includes, for the respective phases, current detection resistors 22bU, 22bV, 22bW, and relays 23bU, 23bV, 23bW for supplying or interrupting voltage to the rotating machine 3.

It is noted that the switching elements 20aU to 21bW are each formed by connecting a diode in antiparallel to a semiconductor switch such as an IGBT, a bipolar transistor, or a MOS power transistor.

The relay control means 8 controls supply and interruption of power to the first voltage application means 7a and the second voltage application means 7b, in initial checking at the time of starting, or when abnormality is detected from various input signals.

Angle information detection means 10 outputs angle information such as an angle θ of the rotating machine 3, a rotation speed w thereof, or a detection signal that varies depending on the angle, to angle calculation means 11 and rotation speed calculation means 12. As the angle information detection means 10, for example, a position detector such as a Hall element, a TMR element, a GMR element, or a resolver, or a rotational detector of electromagnetic type, magnetoelectric type, photoelectric type, or the like, may be used.

The angle calculation means 11 calculates the angle on the basis of the signal obtained by the angle information detection means 10, and outputs the angle to the voltage calculation means 6. If the signal obtained by the angle information detection means 10 is the rotation speed w, the calculation may be performed by integrating the rotation speed w.

The rotation speed calculation means 12 calculates the rotation speed on the basis of the signal obtained by the angle information detection means 10, and outputs the rotation speed to the voltage calculation means 6. If the signal obtained by the angle information detection means 10 is the angle, the rotation speed may be calculated by, for example, differentiating the angle θ or using a difference between the present value and the previous value.

In the case where the signal obtained by the angle information detection means 10 has an error, the signal may be corrected by a known method.

Figure 3:
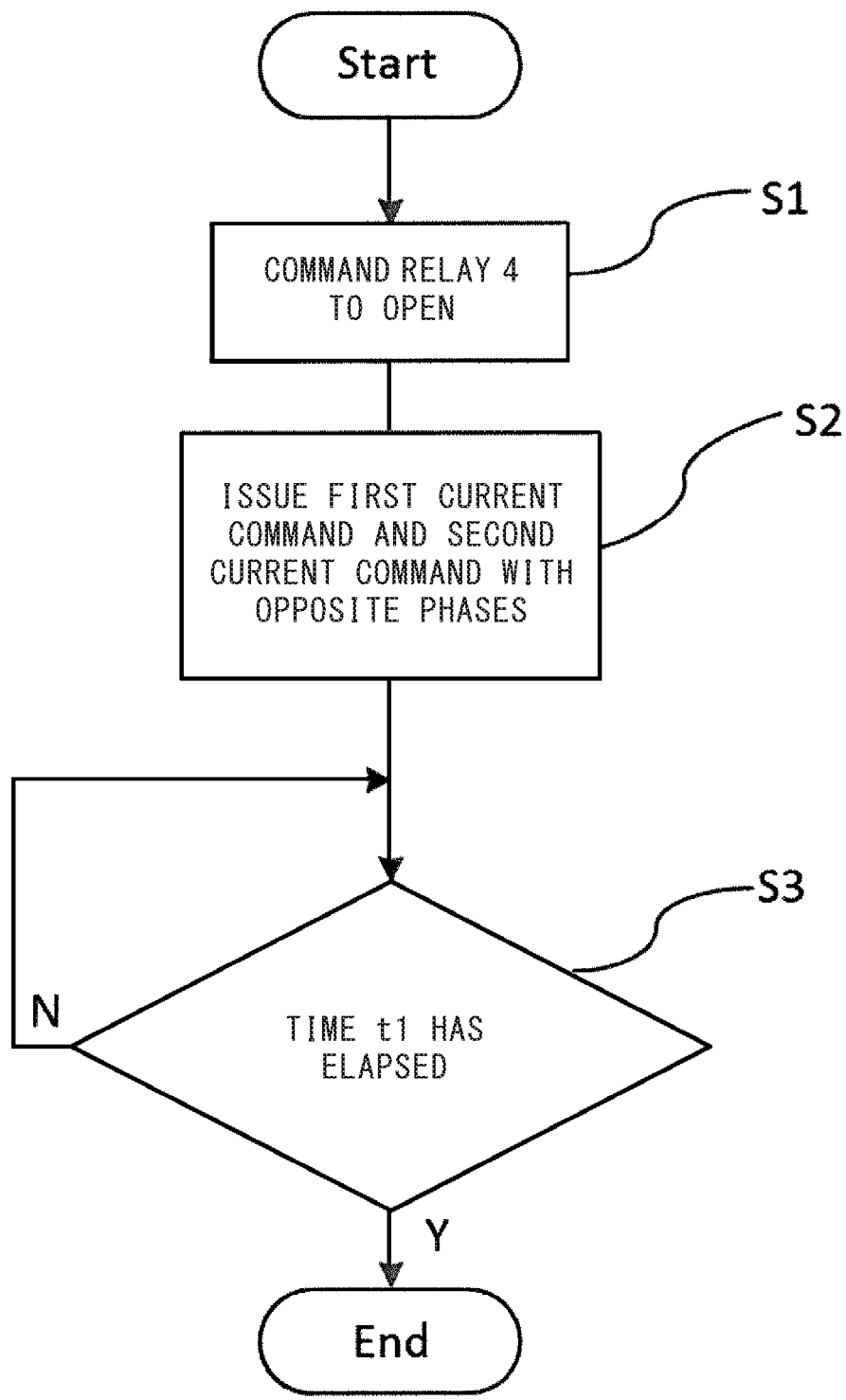
FIG. 3 is a flowchart showing operation of the control device for the rotating machine according to embodiment 1 of the present invention.

Under the above configuration, discharge control for electrically discharging (discharging) electric charge of the smoothing capacitor 5 is performed in accordance with the flowchart shown in FIG. 3.

First, in step S1, the relay control means 8 commands the relay 4 to open.

Next, in step S2, the control command generation means 16 generates the control command C composed of the first current command and the second current command having phases opposite to each other, and transmits the control command C to the voltage calculation means 6. On the basis of the control command C, the voltage calculation means 6 calculates the first voltage commands Vu1, Vv1, Vw1 and the second voltage commands Vu2, Vv2, Vw2, and transmits them to the first switching signal generation means 15a and the second switching signal generation means 15b.

In step S3, whether time t1 has elapsed since the opening of the relay 4 is checked. If the time t1 has elapsed, it is determined that a sufficient time that allows electric charge of the smoothing capacitor 5 to be discharged has elapsed, and thus the process is ended. If the time t1 has not elapsed yet, the state in step S2 is kept while the process is continued.

Here, the first current command is a current command for the first winding set M1, and the second current command is a current command for the second winding set M2. As described later in detail, the first current command and the second current command have phases opposite to each other. The switching signal generation means 15a, 15b respectively generate the first switching signals Qup1, Qun1, Qvp1, . . . , Qwn1 and the second switching signals Qup2, Qun2, Qvp2, . . . , Qwn2 from the first voltage commands Vu1, Vv1, Vw1 and the second voltage commands Vu2, Vv2, Vw2, and transmit the generated signals to the first voltage application means 7a and the second voltage application means 7b. On the basis of the received switching signals, the first voltage application means 7a applies voltages to the windings U1, V1, W1 of the first winding set M1 of the rotating machine 3. Similarly, on the basis of the received switching signals, the second voltage application means 7b applies voltages to the windings U2, V2, W2 of the second winding set M2 of the rotating machine 3.

Next, step S2 will be specifically described.

In the case where, in a rotating two-axis coordinate system, a d-axis component and a q-axis component of the first current command are respectively represented as a first d-axis current command Id1 and a first q-axis current command Iq1, and a d-axis component and a q-axis component of the second current command are respectively represented as a second d-axis current command Id2 and a second q-axis current command Iq2, output torque T of the rotating machine 3 is represented by Expression (1). Here, P is the number of pole pairs and φ is a magnetic flux. In Expression (1), the first term on the right-hand side represents output torque of the first winding set M1 based on the first current command, and the second term on the right-hand side represents output torque of the second winding set M2 based on the second current command.

[Mathematical 1]

$$T = PI_{q1}\phi + PI_{q2}\phi \quad (1)$$

In the case where, after step S1, the capacitance of the smoothing capacitor 5 is denoted by C, the electric charge thereof is denoted by Q, the rotation speed of the rotating machine 3 is denoted by ω, and the resistances of the first winding and the second winding are denoted by R, electrostatic energy Pc, torque power Pt, and copper loss Ploss are represented by Expression (2). That is, discharging can be performed by consuming the electrostatic energy Pc as torque power Pt and copper loss Ploss.

[Mathematical 2]

$$\begin{cases} P_c = \dfrac{Q^2}{2C} \\ P_t = \omega T = \omega(PI_{q1}\phi + PI_{q2}\phi) \\ P_{loss} = R(I_{d1}^2 + I_{q1}^2) + R(I_{d2}^2 + I_{q2}^2) \end{cases} \quad (2)$$

In order to prevent the rotating machine 3 from rotating during execution of discharge control, the output torque T needs to be 0. For example, current commands may be given as shown in Expression (3).

[Mathematical 3]

$$\begin{cases} I_{d2} = I_{d1} = 0 \\ I_{q2} = -I_{q1} \end{cases} \quad (3)$$

At this time, the output torque T, the torque power Pt, and the copper loss Ploss are represented by Expression (4). If Iq1 is 0, the copper loss Ploss is 0. Therefore, Iq1 is set as Iq1≠0. By increasing the absolute value of the q-axis current command, the copper loss can be increased, and the electric charge of the smoothing capacitor 5 can be discharged faster.

[Mathematical 4]

$$\begin{cases} T = 0 \\ P_t = 0 \\ P_{loss} = 2RI_{q1}^2 \end{cases} \quad (4)$$

Therefore, if the first d-axis current command is given as 0, the first q-axis current command is given as Iq (Iq≠0), the second d-axis current command is given as 0, and the second q-axis current command is given as −Iq, torque occurring on the first winding set M1 and torque occurring on the second winding set M2 are cancelled out with each other, and the electrostatic energy is consumed by an amount corresponding to copper loss while the output torque of the rotating machine 3 remains 0, whereby the electric charge of the smoothing capacitor can be discharged, and thus a non-conventional effect can be obtained.

In the case where the absolute value of the q-axis current command is increased, if the phases of output torque of the first winding set M1 and output torque of the second winding set M2 differ from each other due to manufacturing variations or dimension differences, output torque corresponding to the phase difference might arise in the rotating machine 3. Accordingly, in order to increase the copper loss Ploss while decreasing the output torque even if such variations occur, current commands may be given as shown in Expression (5).

[Mathematical 5]

$$\begin{cases} I_{d2} = -I_{d1} \\ I_{q2} = -I_{q1} \end{cases} \quad (5)$$

At this time, the output torque T, the torque power Pt, and the copper loss Ploss are represented by Expression (6).

[Mathematical 6]

$$\begin{cases} T = 0 \\ P_t = 0 \\ P_{loss} = 2R(I_{d1}^2 + I_{q1}^2) \end{cases} \quad (6)$$

Here, in the case where the absolute value of a current vector of one of the first current command and the second current command is 0, from Expression (5), the absolute value of a current vector of the other current command is also 0, so that the copper loss Ploss becomes 0. Therefore, it is necessary that the absolute value of the first or second current vector is not 0. If the absolute value of the current vector is increased, the copper loss Ploss increases, and thus it is possible to discharge the electric charge of the smoothing capacitor 5 faster. In addition, in the case of Expression (5), unlike Expression (4), by supplying also d-axis current, q-axis current needed for obtaining the same copper loss can be suppressed, and thus it is possible to more reliably reduce output torque of each winding set. Therefore, if the first d-axis current command is given as Id (Id≠0), the first q-axis current command is given as Iq (Iq≠0), the d-axis current command for the second winding is given as −Id, and the second q-axis current command is given as −Iq, the absolute value of the q-axis current is suppressed, and consumption of the electrostatic energy by copper loss is further increased while the output torque of the rotating machine 3 remains 0, whereby the electric charge of the smoothing capacitor can be discharged faster, and thus a non-conventional effect can be obtained.

It is noted that, as in Patent Document 2, in the case of supplying d-axis current having a predetermined value Ia without supplying q-axis current, current commands are given as shown in Expression (7).

[Mathematical 7]

$$\begin{cases} I_{d2} = I_{d1} = I_a \\ I_{q2} = I_{q1} = 0 \end{cases} \quad (7)$$

At this time, the output torque T, the torque power Pt, and the copper loss Ploss are represented by Expression (8). Therefore, by increasing the absolute value of Ia, copper loss can be increased without generating output torque in the rotating machine 3, and it is possible to discharge the electric charge of the smoothing capacitor 5 faster.

[Mathematical 8]

$$\begin{cases} T = 0 \\ P_t = 0 \\ P_{loss} = 2RI_a^2 \end{cases} \quad (8)$$

However, in the case where d, q axes on control and d, q axes of the actual device differ from each other by δ, Expression (9) is satisfied.

[Mathematical 9]

$$\begin{cases} I_{d2} = I_{d1} \approx I_a \\ I_{q2} = I_{q1} \approx I_a \delta \end{cases} \quad (9)$$

At this time, the output torque T is represented by Expression (10). That is, in the case where there is an angle error, torque proportional to the error and the current absolute value is outputted.

[Mathematical 10]

$$T = 2PI_a \delta \phi \quad (10)$$

Therefore, in the present embodiment, Expression (11) is used.

[Mathematical 11]

$$\begin{cases} I_{d2} = -I_{d1} \\ I_{q2} = I_{q1} = 0 \end{cases} \quad (11)$$

In this case, if d, q axes on control and d, q axes of the actual device differ from each other by δ, Expression (12) is satisfied.

[Mathematical 12]

$$\begin{cases} I_{d2} \approx -I_{d1} \\ I_{q1} \approx I_{d1} \delta \\ I_{q2} \approx -I_{d1} \delta \end{cases} \quad (12)$$

At this time, the output torque T is represented by Expression (13). That is, even if there is an angle error, torques occurring according to the error have phases opposite to each other and thus can be cancelled out with each other.

[Mathematical 13]

$$T \approx PI_{d1} \delta \phi + P(-I_{d1} \delta) \phi = 0 \quad (13)$$

Therefore, if the first d-axis current command is given as Id (Id≠0), the first q-axis current command is given as 0, the second d-axis current command is given as −Id, and the second q-axis current command is given as 0, even in the case where q-axis current flows due to an angle error, the electrostatic energy can be consumed by an amount corresponding to copper loss while the output torque remains 0, whereby the electric charge of the smoothing capacitor 5 can be discharged, and thus a non-conventional effect can be obtained.

It is noted that the angle used in the voltage calculation means 6 contains an error occurring in the angle information detection means 10, and for example, can contain a rotation n-order component. Since the voltage calculation means 6 performs conversion between a rotating two-axis coordinate system and a three-phase coordinate system at rest using the above angle, torque ripple occurs due to the angle error. During execution of discharge control, the voltage calculation means 6 performs control using a fixed angle, whereby torque ripple occurring due to a rotation n-order angle error can be suppressed, and thus a non-conventional effect can be obtained.

Even if the current commands are determined such that output torques of the first winding set M1 and the second winding set M2 are cancelled out so as not to appear as a behavior, actual output torque might not become 0, depending on dimension difference between the two winding sets. Torque is transmitted to the outside via the output shaft of the rotating machine 3 after the output shaft is twisted. Therefore, in order to keep the output torque at such a level that the torque is not transmitted to the outside, the discharge control may be switched between execution and stop. For example, the discharge control is executed during 100 us, then the discharge control is stopped during 200 us, then the discharge control is executed during 100 us, . . . , and in this way, by intermittently executing the discharge control at certain time intervals, it is possible to stop the discharge control before the torque is transmitted to the outside. That is, by performing discharge control at a predetermined frequency, it is possible to obtain a non-conventional effect of discharging the smoothing capacitor while suppressing torque transmitted to the outside.

In addition, suppressing occurrence of torque ripple or rotation torque provides an effect of preventing a user from having an uncomfortable feeling due to execution of the discharge control in the electric power steering control device 100 shown in FIG. 1.

Embodiment 2

Hereinafter, embodiment 2 of the present invention will be described with reference to FIG. 4 to FIG. 6. Parts that are the same as or correspond to those shown in FIG. 1 to FIG. 3 are denoted by the same reference characters, and the description thereof is omitted.

Figure 4:
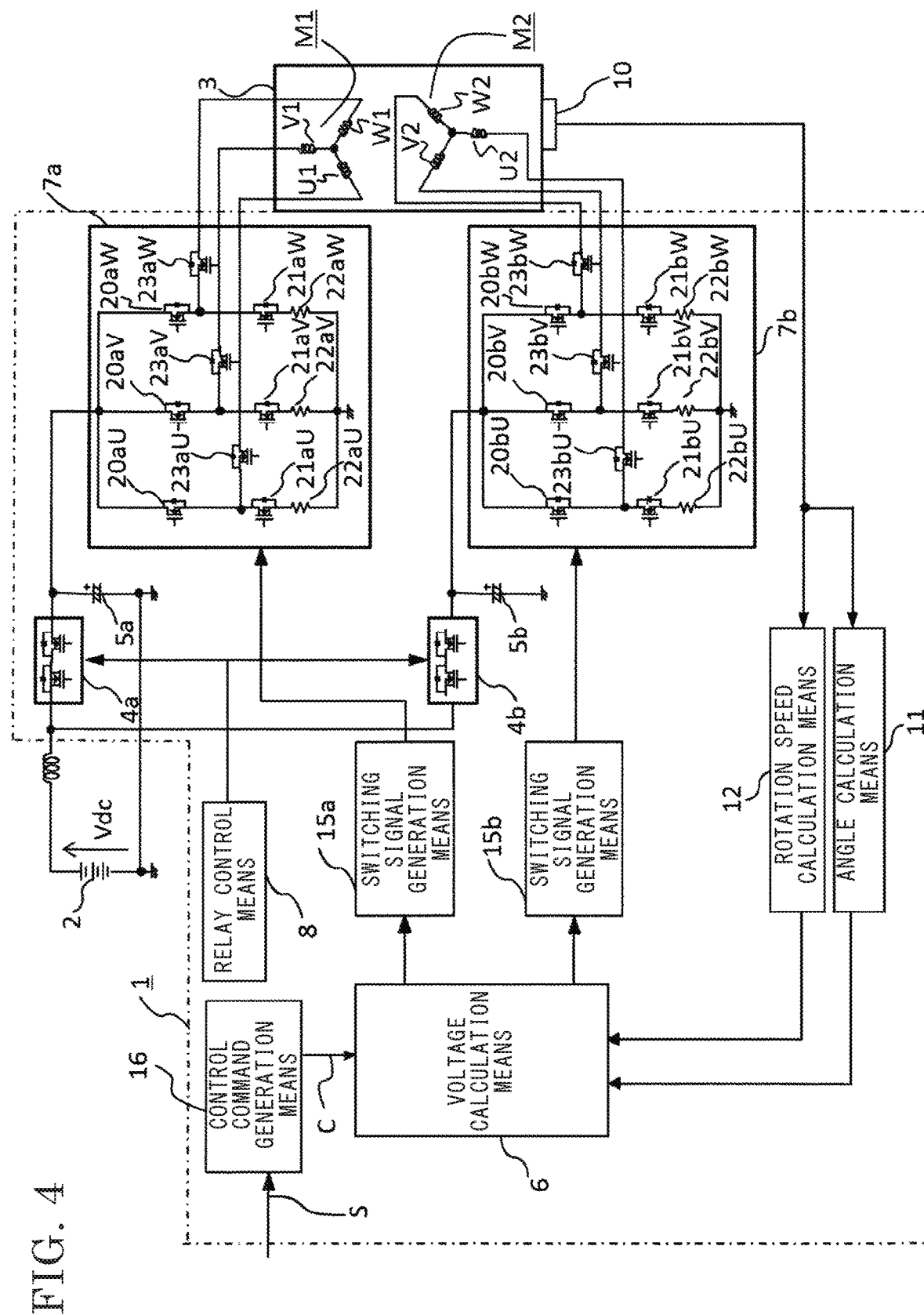
FIG. 4 is an entire configuration diagram showing a control device for a rotating machine according to embodiment 2 of the present invention.

FIG. 4 is a diagram showing the entire configuration of a control device for a rotating machine according to embodiment 2 of the present invention.

Description of parts that are common with embodiment 1 is omitted. Embodiment 2 is different from embodiment 1 in that the control unit in embodiment 1 includes the relay 4 and the smoothing capacitor 5, whereas a control unit in embodiment 2 includes a first relay 4a, a second relay 4b, a first smoothing capacitor 5a, and a second smoothing capacitor 5b. The first relay 4a is connected between the DC power supply 2 and the first smoothing capacitor 5a, and is controlled by the relay control means 8 so as to supply or interrupt power to the first voltage application means 7a. The first smoothing capacitor 5a is connected in parallel to the DC power supply 2 and suppresses variation in bus current, thereby achieving stable DC current. The second relay 4b is connected between the DC power supply 2 and the second smoothing capacitor 5b, and is controlled by the relay control means 8 so as to supply or interrupt power to the second voltage application means 7b. The second smoothing capacitor 5b is connected in parallel to the DC power supply 2 and suppresses variation in bus current, thereby achieving stable DC current.

Figure 5:
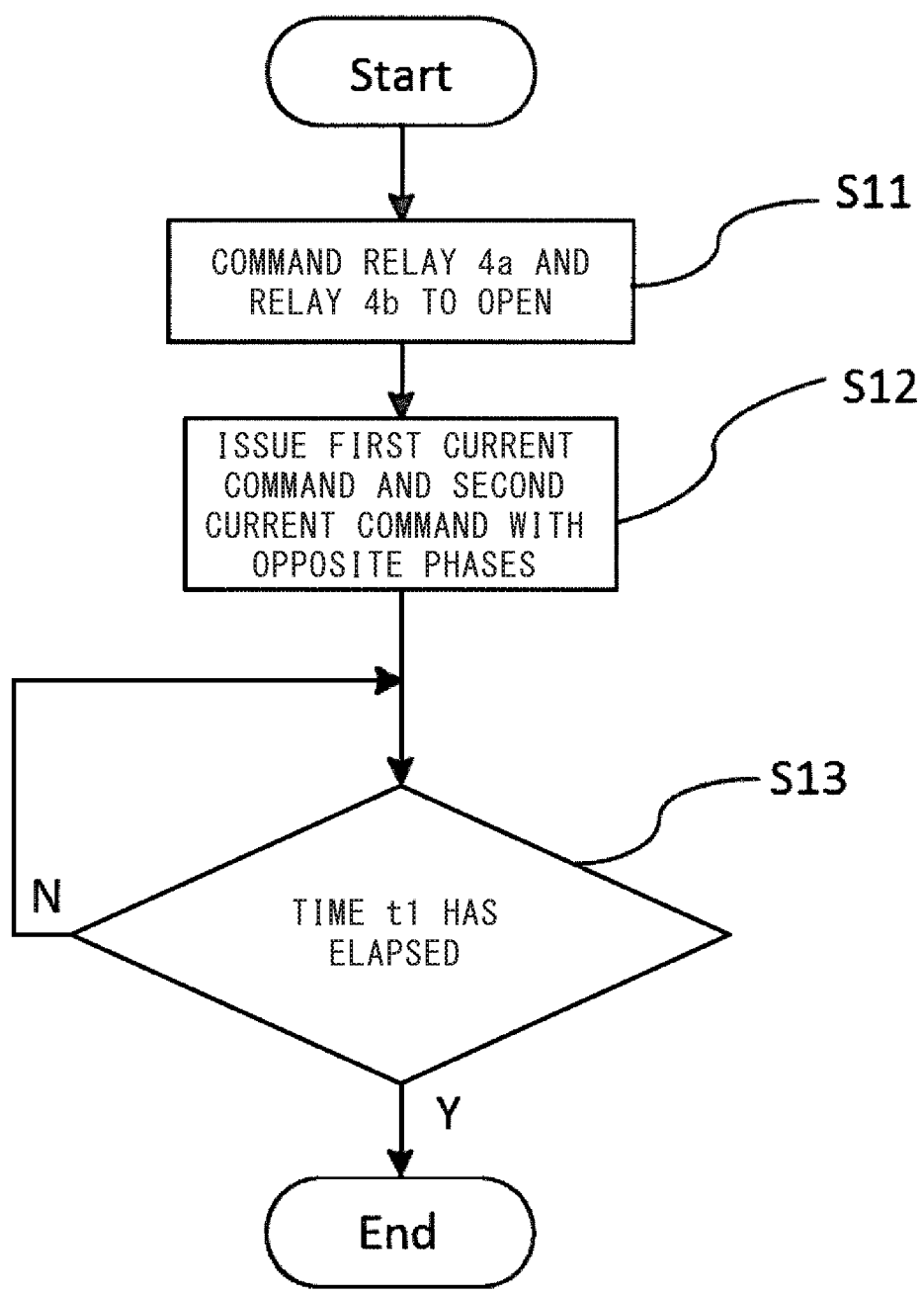
FIG. 5 is a flowchart showing operation of the control device for the rotating machine according to embodiment 2 of the present invention.
Figure 6:
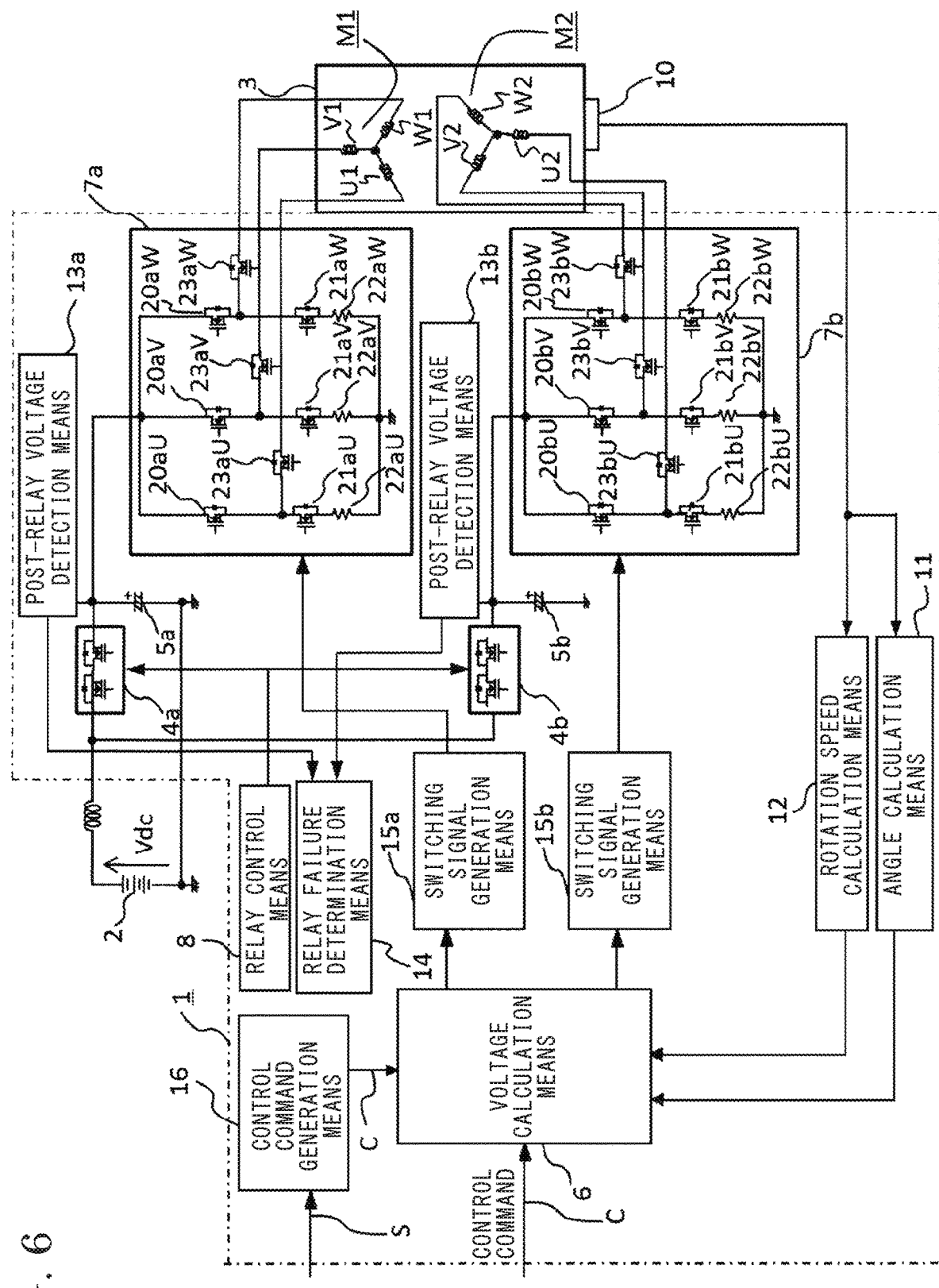
FIG. 6 is an entire configuration diagram showing a control device for a rotating machine in another example of embodiment 2 of the present invention.

In the above configuration, discharge control for electrically discharging (discharging) electric charges of the first smoothing capacitor 5a and the second smoothing capacitor 5b is performed in accordance with the flowchart shown in FIG. 5.

First, in step S11, the relay control means 8 commands the first relay 4a and the second relay 4b to open.

Next, in step S12, the control command generation means 16 generates the control command C composed of the first current command and the second current command having phases opposite to each other, and transmits the control command C to the voltage calculation means 6. On the basis of the control command C, the voltage calculation means 6 calculates the first voltage commands Vu1, Vv1, Vw1 and the second voltage commands Vu2, Vv2, Vw2, and transmits them to the first switching signal generation means 15a and the second switching signal generation means 15b, respectively.

In step S13, whether time t1 has elapsed since the opening of the relay 4 is checked. If the time t1 has elapsed, it is determined that a sufficient time that allows electric charges of the first smoothing capacitor 5a and the second smoothing capacitor 5b to be discharged has elapsed, and thus the process is ended. If the time t1 has not elapsed yet, the state in step S12 is kept while the process is continued.

It is noted that, as in embodiment 1, the first current command is a current command for the first winding set M1, and the second current command is a current command for the second winding set M2.

Hereinafter, step S12 will be specifically described.

For example, if the current commands are given as shown in Expression (5), output torque of the first winding and output torque of the second winding are cancelled out with each other and thus the output torque T becomes 0 as shown in Expression (14).

[Mathematical 14]

$$T = PI_{q1}\phi + P(-I_{q1})\phi = 0 \quad (14)$$

In the case where, after step S11, the capacitance of the smoothing capacitor 5a is C1, the electric charge thereof is Q1, the capacitance of the smoothing capacitor 5b is C2, the electric charge thereof is Q2, the rotation speed of the rotating machine 3 is w, and the resistances of the first winding and the second winding are R, electrostatic energy Pc1 of the smoothing capacitor 5a, torque power Pt1 of the first winding set M1, copper loss Ploss1 of the first winding set, electrostatic energy Pc2 of the smoothing capacitor 5b, torque power Pt2 of the second winding set M2, and copper loss Ploss2 of the second winding set are represented by Expression (15).

[Mathematical 15]

$$\begin{cases} P_{c1} = \dfrac{Q_1^2}{2C_1} \\ P_{t1} = \omega T_1 = \omega P I_{q1}\phi \\ P_{loss1} = R(I_{d1}^2 + I_{q1}^2) \\ P_{c2} = \dfrac{Q_2^2}{2C_2} \\ P_{t2} = \omega T_2 = \omega P I_{q2}\phi = -\omega P I_{q1}\phi \\ P_{loss2} = R(I_{d2}^2 + I_{q2}^2) = R(I_{d1}^2 + I_{q1}^2) \end{cases} \quad (15)$$

In the case of giving a q-axis current command so that the output torque T is cancelled out, torque powers Pt1 and Pt2 of the first winding set M1 and the second winding set M2 have phases opposite to each other as shown in Expression (15). During high-speed rotation, torque power of either the first winding or the second winding serves for regeneration, and therefore acts so as to increase the electrostatic energy of the smoothing capacitor. That is, this serves to cancel out copper loss, but if decrease in the electrostatic energy due to copper loss exceeds increase in the electrostatic energy due to regeneration as shown in Expression (16), electric charge of the smoothing capacitor is discharged, and therefore the rotation speed ω is set to satisfy Expression (17).

[Mathematical 16]

$$|P_{t1}| < P_{loss1} \quad (16)$$

[Mathematical 17]

$$\omega < \dfrac{R(I_{d1}^2 + I_{q1}^2)}{P|I_{q1}|\phi} \quad (17)$$

Therefore, in the case where the q-axis current command is not 0, one winding set consumes the electrostatic energy by an amount of (copper loss+power-running torque power), thereby allowing faster discharging than by only copper loss, and if the rotation speed is equal to or smaller than a predetermined value satisfying Expression (17), also the other winding set consumes the electrostatic energy by an amount of (copper loss−regenerative torque power), thereby allowing the discharging, and thus a non-conventional effect can be obtained. It is noted that, here, it is assumed that regeneration occurs in the first winding set M1, but the same applies even in the case where regeneration occurs in the second winding set M2. In addition, here, the range of the rotation speed is shown by Expression (17), but in the case where the current commands are given by Expression (3), the same effect can be obtained if the rotation speed is set to be equal to or smaller than a predetermined value satisfying Expression (18).

[Mathematical 18]

$$\omega < \frac{R|I_{q1}|}{P\phi} \quad (18)$$

In a rotating state, the speed of decrease in electric charge during execution of discharge control differs between the smoothing capacitor 5a and the smoothing capacitor 5b. Therefore, if a higher decrease speed and a lower decrease speed are switched therebetween, a difference between electric charge in the smoothing capacitor 5a and electric charge in the smoothing capacitor 5b can be reduced. That is, by setting the control command generation means 16 so as to switch the phases of the first current command and the second current command during discharge control, a nonconventional effect of enabling equalization in the electric discharge effect can be obtained.

Needless to say, also in the present embodiment 2, the same effect is obtained by giving current commands shown in Expression (11) as in embodiment 1.

Next, another example of embodiment 2 will be described. FIG. 6 is a diagram showing the entire configuration of a control device for a rotating machine according to another example of embodiment 2. The control unit 1 shown in FIG. 6 further includes first post-relay voltage detection means 13a, second post-relay voltage detection means 13b, and relay failure determination means 14.

The first post-relay voltage detection means 13a detects post-relay voltage which is voltage after the first relay 4a with respect to the DC power supply 2, i.e., voltage of the load-side contact, and outputs the detected voltage to the relay failure determination means 14.

The second post-relay voltage detection means 13b detects post-relay voltage which is voltage after the second relay 4b with respect to the DC power supply 2, i.e., voltage of the load-side contact, and outputs the detected voltage to the relay failure determination means 14.

The relay failure determination means 14 performs determination as to failure of the relay on the basis of the post-relay voltages obtained by the first post-relay voltage detection means 13a and the second post-relay voltage detection means 13b.

In the case where the first relay 4a is normal and the second relay 4b has a short-circuit failure, when they are commanded to open by the relay control means 8, the first relay 4a is opened and the second relay 4b is short-circuited. If discharge control is performed in this state, electric charge of the first smoothing capacitor 5a is discharged but electric charge of the second smoothing capacitor 5b is not discharged because supply from the DC power supply 2 is not stopped. That is, voltage obtained by the first post-relay voltage detection means 13a sufficiently decreases with respect to the DC power supply 2, but voltage obtained by the second post-relay voltage detection means 13b is approximately equal to voltage of the DC power supply 2. Therefore, after discharge control is performed in order to discharge the electric charges of the smoothing capacitors, failure determination is performed by the relay failure determination means 14, whereby failure of the first relay 4a and the second relay 4b can be detected. In addition, by using post-relay voltages, it is possible to detect short-circuit failure of the first relay 4a and the second relay 4b through a simple determination method in which it is determined that failure occurs if the voltage obtained by the post-relay voltage detection means is equal to or greater than a predetermined value, for example. Here, failure determination is performed using post-relay voltages, but failure determination may be performed using another detection value such as current flowing through the windings.

It is noted that, if relay failure determination is performed after discharge control at the time of starting the control unit 1, a time period for standing by until the discharging is completed is needed. Therefore, if the voltage calculation means 6 is configured so as to perform discharge control at the time of shutting down, discharge control is automatically performed at the time of shutting down, whereby the electric charges of the smoothing capacitors are partially or entirely discharged. As a result, in discharge control at the time of starting, it is sufficient that only the remaining electric charges are discharged. Therefore, the time period needed for discharging at the time of starting is shortened.

Embodiment 3

Hereinafter, embodiment 3 of the present invention will be described with reference to FIG. 7.

In embodiment 1 and embodiment 2, electric charge of the smoothing capacitor is discharged while output torque occurring in the first winding set M1 and output torque occurring in the second winding set M2 are cancelled out with each other. However, in the case where one of the first voltage application means 7a and the second voltage application means 7b does not operate due to, for example, failure and thus one of the first winding set M1 and the second winding set M2 does not operate normally, the cancellation effect is not obtained. In the present embodiment 3, a discharge control method in the case where one of the voltage application means does not operate in the configuration shown in FIG. 2 will be described. Here, the case where the second voltage application means 7b does not operate will be described, but the same applies to the case where the first voltage application means 7a does not operate.

Figure 7:
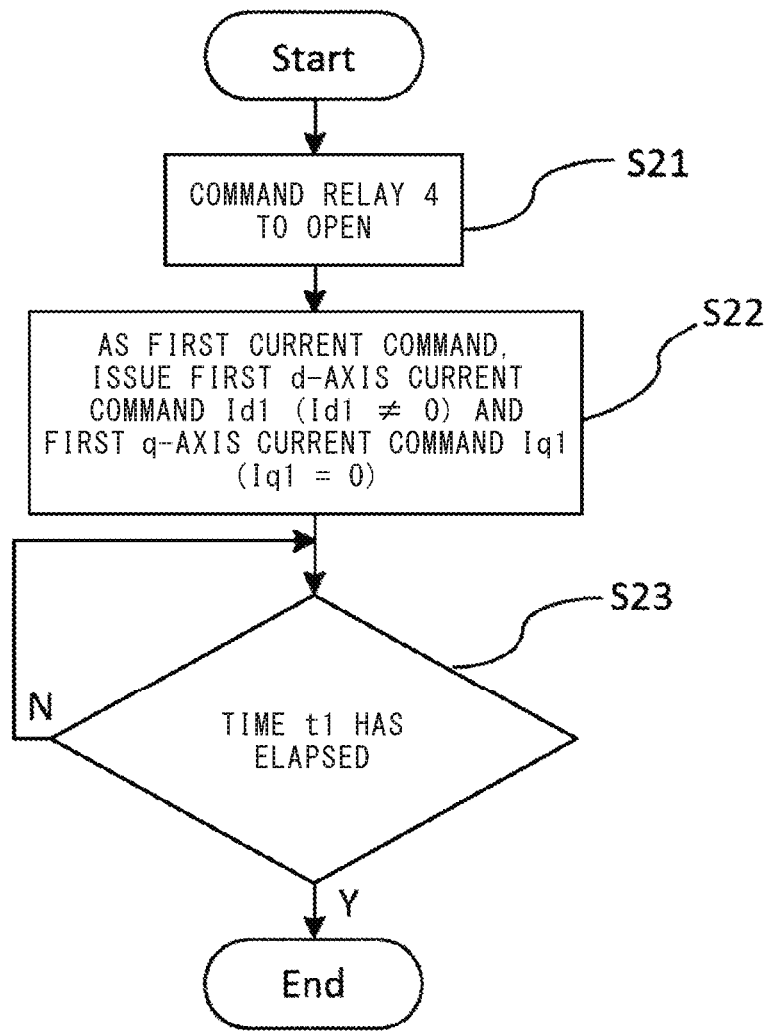
FIG. 7 is a flowchart showing operation of a control device for a rotating machine according to embodiment 3 of the present invention.

FIG. 7 is a flowchart showing discharge control in embodiment 3.

First, in step S21, the relay control means 8 commands the relay 4 to open.

Next, in step S22, the control command generation means 16 generates a control command C composed of a first current command, and transmits the control command C to the voltage calculation means 6. On the basis of the control command C, the voltage calculation means 6 calculates first voltage commands Vu1, Vv1, Vw1 and transmits them to the first switching signal generation means 15a. Here, the first current command is configured such that a first d-axis current command Id1 which is a d-axis component in a rotating two-axis system satisfies Id1≠0 and a first q-axis current command Iq which is a q-axis component satisfies Iq=0.

In step S23, whether time t1 has elapsed since the opening of the relay 4 is checked. If the time t1 has elapsed, it is determined that a sufficient time that allows electric charge of the smoothing capacitor 5 to be discharged has elapsed, and thus the process is ended. If the time t1 has not elapsed yet, the state in step S2 is kept while the process is continued.

Next, step S22 will be specifically described.

In the case where reluctance torque exists, output torque T is represented by Expression (19). Here, P is the number of pole pairs, ϕ is a magnetic flux, Ld is a d-axis inductance, and Lq is a q-axis inductance.

[Mathematical 19]

$$T=PI_{q1}\{\phi+(L_d-L_q)I_{d1}\} \quad (19)$$

In the case where, after step S21, the capacitance of the smoothing capacitor 5 is denoted by C, the electric charge thereof is denoted by Q, the rotation speed of the rotating machine 3 is denoted by ω, and the resistance of the first winding set M1 is denoted by R, electrostatic energy Pc, torque power Pt, and copper loss Ploss are represented by Expression (20). That is, discharging can be performed by consuming the electrostatic energy Pc as torque power Pt and copper loss Ploss.

[Mathematical 20]

$$\begin{cases} P_c = \dfrac{Q^2}{2C} \\ P_t = \omega T = \omega PI_{q1}\{\phi + (L_d - L_q)I_{d1}\} \\ P_{loss} = R(I_{d1}^2 + I_{q1}^2) \end{cases} \quad (20)$$

In order to prevent the rotating machine 3 from rotating during execution of discharge control, the output torque T needs to be 0. For example, current commands may be given as shown in Expression (21).

[Mathematical 21]

$$\begin{cases} I_{d1} = I_b \\ I_{q1} = 0 \end{cases} \quad (21)$$

At this time, the output torque T, the torque power Pt, and the copper loss Ploss are represented by Expression (22). By increasing the absolute value of the d-axis current command, the copper loss can be increased, and the electric charge of the smoothing capacitor 5 can be discharged faster.

[Mathematical 22]

$$\begin{cases} T = 0 \\ P_t = 0 \\ P_{loss} = RI_b^2 \end{cases} \quad (22)$$

Therefore, in the case where one of the first winding set M1 and the second winding set M2 is abnormal, in discharge control, if the d-axis current command and the q-axis current command for the normal winding set are respectively given as Id (Id≠0) and 0, the electrostatic energy is consumed by an amount corresponding to copper loss while the output torque remains 0, whereby the electric charge of the smoothing capacitor can be discharged, and thus a non-conventional effect can be obtained.

However, in the case where d, q axes on control and d, q axes of the actual device differ from each other by δ, Expression (23) is satisfied.

[Mathematical 23]

$$\begin{cases} I_{d1} \approx I_b \\ I_{q1} \approx I_b\delta \end{cases} \quad (23)$$

At this time, the output torque T is represented by Expression (24). That is, in the case where there is an angle error, torque proportional to the error and the current absolute value arises. On the other hand, there is mechanical loss in the rotating machine 3 and a mechanism mounted to the output shaft of the rotating machine 3 via a gear, a chain, and the like. The rotating machine 3 does not rotate as long as the output torque T is within the mechanical loss. Therefore, Ib is determined so that the output torque T in Expression (24) falls within the mechanical loss. It is noted that the mechanical loss may be stored in a mechanical loss storage unit (not shown) in advance and the range of Ib that causes the output torque T in Expression (24) to fall within the mechanical loss may be calculated by reading the mechanical loss at the time of generating the d-axis current command.

[Mathematical 24]

$$T=PI_b\delta\{\phi+(L_d-L_q)I_b\} \quad (24)$$

In general, of the d-axis inductance Ld and the q-axis inductance Lq, the q-axis inductance Lq is greater. Therefore, in order to reduce the output torque T, Ib may be set to satisfy Ib>0 so that the magnet torque component and the reluctance torque component have signs opposite to each other.

As described above, in the case where one of the first winding and the second winding is abnormal, the current commands in a rotating two-axis coordinate system during discharge control are given such that the d-axis current command and the q-axis current command for the normal winding are Id (Id≠0) and 0, respectively, whereby a non-conventional effect of allowing driving in a state in which the output torque is 0 or within the mechanical loss can be obtained.

Embodiment 4

Hereinafter, embodiment 5 of the present invention will be described with reference to FIG. 8 to FIG. 10.

In embodiments 1 to 3, in discharge control, the control command generation means 16 outputs current commands having phases opposite to each other, whereby output torque of the first winding set M1 and output torque of the second winding set M2 are cancelled out with each other. On the other hand, in embodiment 4, the voltage calculation means 6 outputs voltage commands having phases opposite to each other. In the case where the d-axis component and the q-axis component of the first voltage command are respectively denoted by Vd1 and Vq1 and the d-axis component and the q-axis component of the second voltage command are respectively denoted by Vd2 and Vq2, if the commands are issued with phases opposite to each other, Expression (25) is satisfied.

[Mathematical 25]

$$\begin{cases} V_{d2} = -V_{d1} \\ V_{q2} = -V_{q1} \end{cases} \quad (25)$$

For Vd1, Vq1, Vd2, and Vq2, voltage equations of Expression (26) are satisfied.

[Mathematical 26]

$$\begin{cases} V_{d1} = RI_{d1} - \omega L_q I_{q1} \\ V_{q1} = RI_{q1} + \omega(L_d I_{d1} + \phi) \\ V_{d2} = RI_{d2} - \omega V_q I_{q2} \\ V_{q2} = RI_{q2} + \omega(L_d I_{d2} + \phi) \end{cases} \quad (26)$$

In a region where ω is minute, Id1, Iq1, Id2, and Iq2 are represented by Expression (27).

[Mathematical 27]

$$\begin{cases} I_{d1} \approx \dfrac{RV_{d1} + \omega L_q V_{q1} - \omega^2 L_q \phi}{R^2 + \omega^2 L_d L_q} \approx \dfrac{V_{d1}}{R} \\ I_{q1} = \dfrac{RV_{q1} - \omega L_d V_{d1} - \omega R \phi}{R^2 + \omega^2 L_d L_q} \approx \dfrac{V_{q1}}{R} \\ I_{d2} = \dfrac{RV_{d2} + \omega L_q V_{q2} - \omega^2 L_q \phi}{R^2 + \omega^2 L_d L_q} \approx \dfrac{V_{d2}}{R} = -I_{d1} \\ I_{q2} = \dfrac{RV_{q2} - \omega L_d V_{d2} - \omega R \phi}{R^2 + \omega^2 L_d L_q} \approx \dfrac{V_{q2}}{R} = -I_{q1} \end{cases} \quad (27)$$

That is, if the first voltage command and the second voltage command are issued with phases opposite to each other, currents having phases opposite to each other flow through the first winding set M1 and the second winding set M2. That is, the same effect as in the case of issuing the first current command and the second current command with phases opposite to each other is obtained. Therefore, in discharge control, if the first voltage command and the second voltage command are issued with phases opposite to each other, the electrostatic energy is consumed by an amount corresponding to copper loss while the output torque T remains 0, whereby the electric charge of the smoothing capacitor can be discharged, and thus a non-conventional effect can be obtained. Hereinafter, the cases where a phase difference between current flowing through the first winding set M1 and current flowing the second winding set M2 is 0, π/3, and π/6 will be described.

(Case where Phase Difference is 0)

Figure 8:
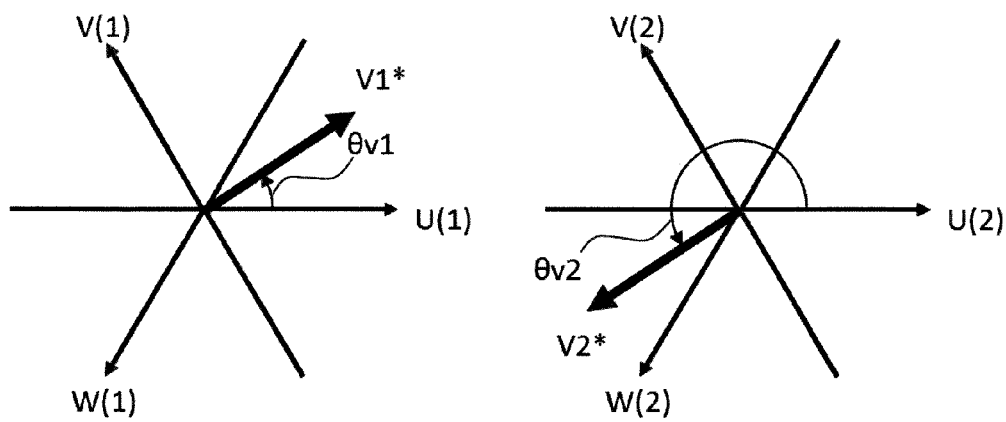
FIG. 8 is a voltage vector diagram of voltage commands in the case where there is no phase difference between currents flowing through two winding sets.

In this case, a first voltage command vector V1* based on the first voltage command and a second voltage command vector V2* based on the second voltage command can be represented on U(1)–V(1)–W(1) axes and U(2)–V(2)–W(2) axes as shown in FIG. 8. Numbers in the parentheses indicate an axis corresponding to the first winding set M1 and an axis corresponding to the second winding set M2 in a discriminating manner. U(1), V(1), and W(1) which are accompanied with (1) respectively represent axes corresponding to U phase, V phase, and W phase of the first winding set M1, and U(2), V(2), and W(2) which are accompanied with (2) respectively represent axes corresponding to U phase, V phase, and W phase of the second winding set M2. Here, with the axis U(1) as a reference, the phase angle of the first voltage command vector V1* is θv1 and the phase angle of the second voltage command vector V2* is θv2. Here, the axes U(2), V(2), and W(2) respectively coincide with the axes U(1), V(1), and W(1). Therefore, in order to issue the voltage command vectors with phases opposite to each other so as to satisfy θv2=θv1+π, the second voltage commands Vu2, Vv2, Vw2 may be set to values having phases opposite to those of the first voltage commands Vu1, Vv1, Vw1, respectively.

In FIG. 8, V1* is between the axis U(1) and the axis −W(1), and therefore can be represented using Vu1 and Vw1, with Vv1 set to 0.

V2* is between the axis −U(2) and the axis W(2), and therefore can be represented using Vu2 and Vw2, with Vv2 set to 0. Since the sum of three-phase voltage commands is 0, Expression (28) is satisfied.

[Mathematical 28]

$$\begin{cases} V_{u1} = V_a \\ V_{w1} = -V_a \end{cases} \quad (28)$$

By setting Vu2 and Vw2 to values having phases opposite to those of Vu1 and Vw1 as shown in Expression (29), it is possible to issue the first voltage command vector V1* and the second voltage command vector V2* with phases opposite to each other.

[Mathematical 29]

$$\begin{cases} V_{u2} = -V_{u1} = -V_a \\ V_{w2} = -V_{w1} = V_a \end{cases} \quad (29)$$

Therefore, in the case where the voltage command for A phase of the first voltage commands is Va, if the voltage command for B phase of the first voltage commands is set to −Va, the voltage command for A phase of the second voltage commands is set to −Va, and the voltage command for B phase of the second voltage commands is set to Va, the electrostatic energy is consumed by an amount corresponding to copper loss while the output torque remains 0, whereby the electric charge of the smoothing capacitor can be discharged, and thus a non-conventional effect can be obtained.

In order to set the voltage command Vv1 for V phase of the first voltage commands to 0, the switching element 20aV of the upper arm and the switching element 21aV of the lower arm for V phase of the first voltage application means 7a are to be turned off, and in order to set the voltage command Vv2 for V phase of the second voltage commands, the switching element 20bV of the upper arm and the switching element 21bV of the lower arm for V phase of the second voltage application means 7b are to be turned off. That is, in the first voltage application means, the switching element for A phase among the switching elements of the upper arms is turned on (the switching element 20aU of the upper arm is turned on), the switching element for B phase among the switching elements of the lower arms is turned on (the switching element 21aW of the lower arm is turned on), and the other switching elements are turned off, and in the second voltage application means, the switching element for A phase among the switching elements of the lower arms is turned on (the switching element 21bU of the lower arm is turned on), the switching element for B phase among the switching elements of the upper arms is turned on (the switching element 20bW of the upper arm is turned on), and the other switching elements are turned off. In this way, using the arms for two phases in each voltage application means, the electrostatic energy is consumed by an amount corresponding to copper loss while the output torque remains 0, whereby the electric charge of the smoothing capacitor can be discharged, and thus a non-conventional effect can be obtained.

It is noted that, in order to set the voltage command Vv1 for V phase of the first voltage commands to 0, the relay 23aV may be turned off so as to cut connection to the first winding set M1, and in order to set the voltage command Vv2 for V phase of the second voltage commands to 0, the relay 23bV may be turned off so as to cut connection to the second winding set M2. Needless to say, also in this case, the same effect can be obtained. In addition, in the case where there is a phase in which open-circuit failure occurs in at least one of the switching elements of the upper arm and the lower arm, the first switching signal generation means 15a or the second switching signal generation means 15b performs ON/OFF operations of the switching elements for the non-failed phases while turning off the switching element of the arm on the non-failed side for the phase in which open-circuit failure occurs, whereby the electrostatic energy is consumed by an amount corresponding to copper loss while the output torque T remains 0 without influence of the phase in which open-circuit failure occurs, and the electric charge of the smoothing capacitor can be discharged. Thus, a non-conventional effect can be obtained.

(Case where phase difference is $n\pi/3$ (n is integer not less than 0))

Figures 9A, 9B:
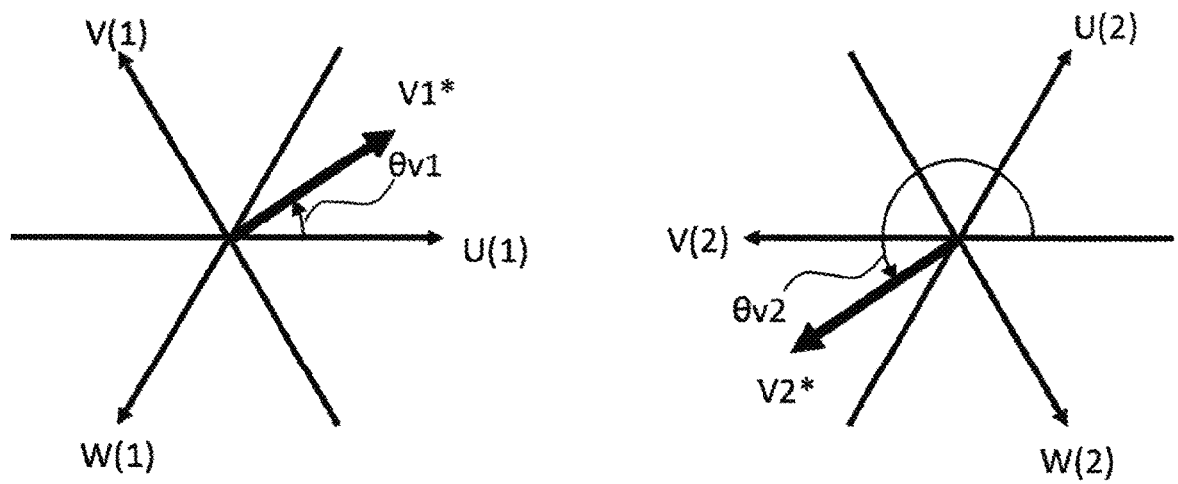
FIG. 9A is a voltage vector diagram of voltage commands in the case where a phase difference between currents flowing through two winding sets is π/3.
FIG. 9B is a diagram showing a second voltage command with respect to each phase difference.

In the case where the phase difference is $\pi/3$, as shown in FIG. 9A, the axes $-W(2)$, $-U(2)$, and $-V(2)$ in the case where the phase difference is 0 are respectively replaced with the axes $U(2)$, $V(2)$, and $W(2)$. In the case where the phase difference between current flowing through the first winding and current flowing through the second winding is $n\pi/3$ (n is integer not less than 0), in order to issue the voltage command vectors with phases opposite to each other so as to satisfy $\theta v2=\theta v1+\pi$, the second voltage commands Vu2, Vv2, Vw2 are to be set at values shown in FIG. 9B(b).

(Case where phase difference is $(\pi/6+n\pi/3$ (n is integer not less than 0)))

Figures 10A, 10B:
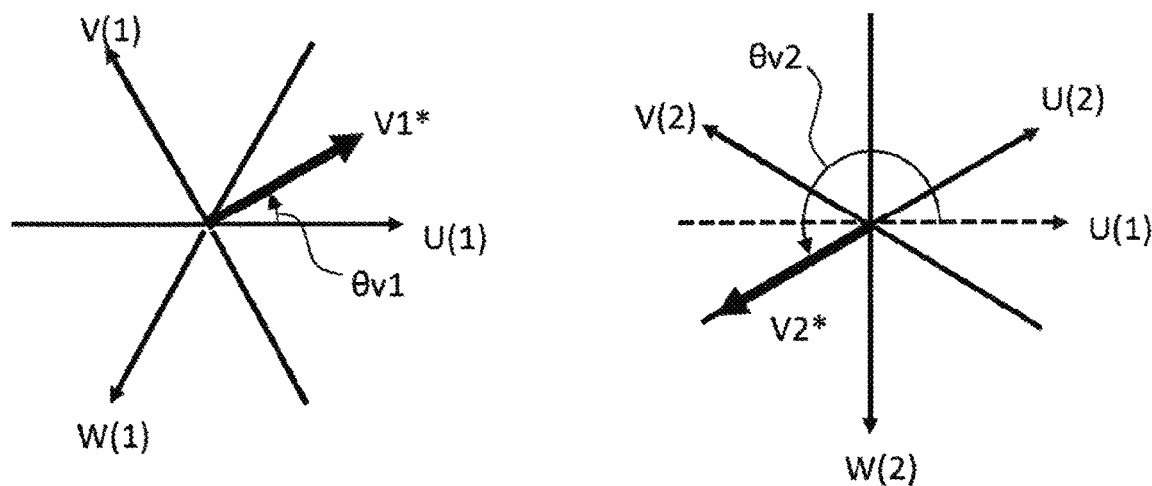
FIG. 10A is a voltage vector diagram of voltage commands in the case where a phase difference between currents flowing through two winding sets is π/6, and a diagram showing a second voltage command with respect to each phase difference.
FIG. 10B is a diagram showing a second voltage command with respect to each phase difference.

In the case where the phase difference is $\pi/6$, as shown in FIG. 10A, the axes $U(2)$, $V(2)$, and $W(2)$ are respectively shifted by $\pi/6$ from the axes $U(1)$, $V(1)$, and $W(1)$. In FIG. 10A, the first voltage command vector V1* is between the axis $U(1)$ and the axis $-W(1)$, and therefore can be represented using Vu1 and Vw1, with Vv1 set to 0. The second voltage command vector V2* is on the axis $-U(2)$, and the current flows through the upper arm for one of the phases to the second winding set M2, and flows through the lower arm for one of the phases to the DC power supply 2 or the smoothing capacitor 5. Therefore, it is impossible to apply only the voltage command Vu2 for V phase of the second voltage commands. That is, in the case where the phase difference is $\pi/6$, it is impossible to generate voltage command vectors having opposite phases through operations of the switching elements for two phases, and therefore, when the first voltage commands Vu1 and Vw1 are given as shown in Expression (28), the second voltage commands Vu2, Vv2, Vw2 are given as shown in Expression (30) to achieve the purpose.

[Mathematical 30]

$$\begin{cases} V_{u2} = -\dfrac{2}{\sqrt{3}} V_a \\ V_{v2} = V_{w2} = \dfrac{V_a}{\sqrt{3}} \end{cases} \quad (30)$$

Therefore, in the case where the voltage command for A phase of the first voltage commands is Va, if the voltage command for B phase of the first voltage commands is set to $-Va$, the voltage command for C phase of the second voltage commands, which coincides with a synthetic vector of the voltage command for A phase and the voltage command for B phase, is set to $-2Va/\sqrt{3}$, and the voltage commands for D phase and E phase of the second voltage commands are set to $Va/\sqrt{3}$, in a state in which one of the winding sets has a phase in which current is not supplied, the output torque T is made to be 0 and the electrostatic energy is consumed by an amount corresponding to copper loss, whereby the electric charge of the smoothing capacitor 5 can be discharged, and thus a non-conventional effect can be obtained. In the case where the phase difference is $(\pi/6+n\pi/3$ (n is integer not less than 0)), the same effect can be obtained by giving the second voltage commands as shown in FIG. 10(b).

In the case where there is a phase in which open-circuit failure occurs in at least one of the switching elements of the upper arm and the lower arm, the phase in which open-circuit failure occurs is determined to be a phase for which the voltage command is set to 0, and the first switching signal generation means 15a or the second switching signal generation means 15b performs ON/OFF operations of the switching elements for the non-failed phases while turning off the switching element of the arm on the non-failed side for the phase in which open-circuit failure occurs, whereby the electrostatic energy is consumed by an amount corresponding to copper loss while the output torque T remains 0 without influence of the phase in which open-circuit failure occurs, and the electric charge of the smoothing capacitor can be discharged. Thus, a non-conventional effect can be obtained.

Here, the case of using Vu1 and Vw1 has been described. However, needless to say, the same effect is obtained also in the case of another combination.

In the above embodiments, the case where the number of the winding sets is two has been described. However, the number of the winding sets is not limited thereto. Even in the case where the number of the winding sets is three or more, if the number of the winding sets is an even number, a pair of winding sets may be configured so as to cancel out torques with each other. If the number of the winding sets is an odd number, in discharge control, currents may be supplied to only a pair of winding sets so as to cancel out torques with each other, thereby preventing occurrence of torque in the rotating machine 3 as a whole.

It is noted that, within the scope of the present invention, the above embodiments may be freely combined with each other, or each of the above embodiments may be modified or simplified as appropriate.

Figure 11:
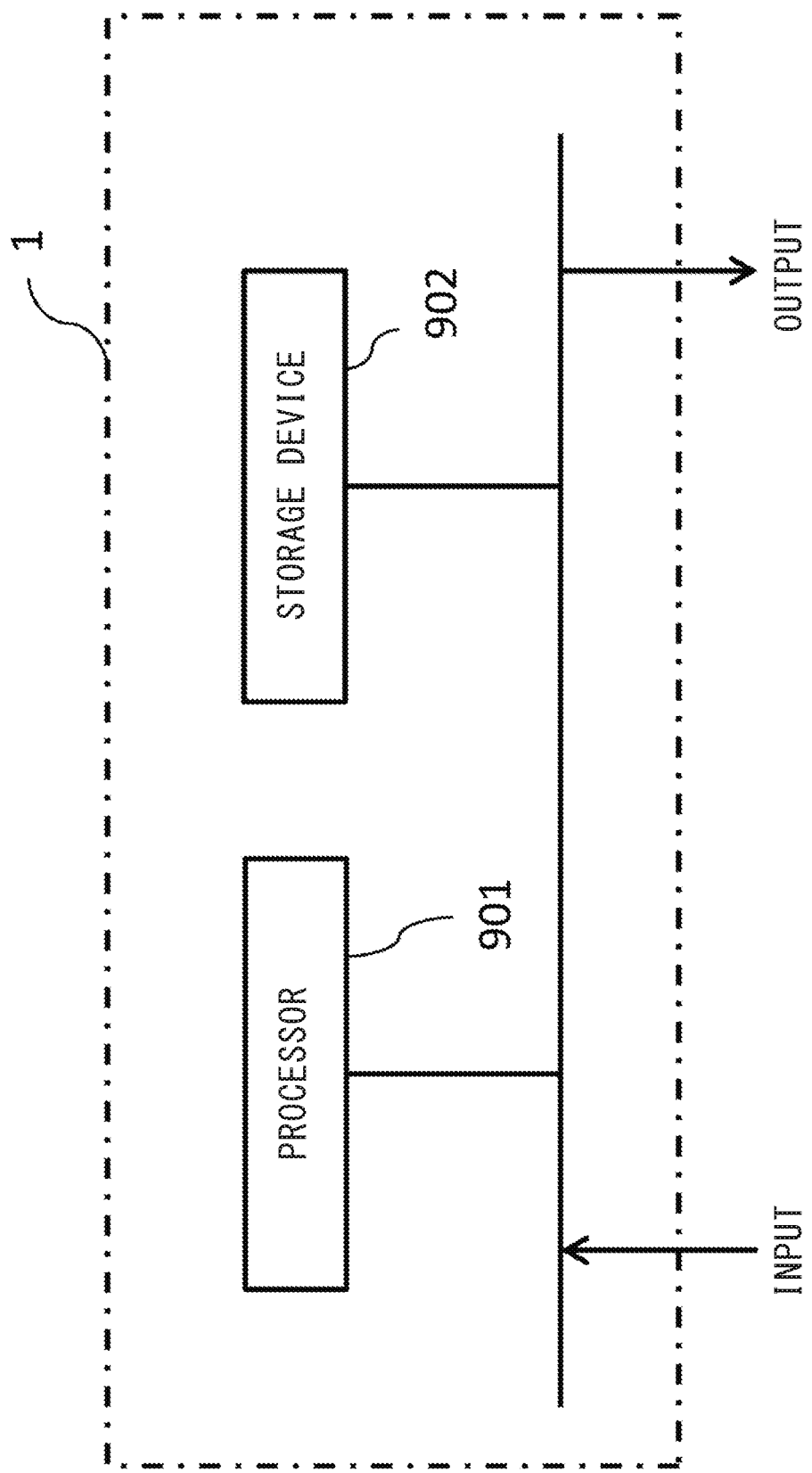
FIG. 11 is a diagram showing the hardware configuration of the control device for the rotating machine according to each embodiment.

FIG. 11 is a diagram showing the hardware configuration of the control device for the rotating machine according to each embodiment. The control unit 1, i.e., the control device for the rotating machine includes: a processor 901 for executing a program for realizing function portions such as the voltage calculation means 6; and a storage device 902 storing the program. Although not shown, the storage device 902 includes a volatile storage device such as a random access memory, and a nonvolatile auxiliary storage device such as a flash memory. It is noted that the flash memory may be replaced with an auxiliary storage device such as a hard disk. When the processor 901 is to execute the program, the program to be executed is inputted to the processor 901 from the auxiliary storage device via the volatile storage device. When data such as a calculation result are generated through execution of the program, the processor 901 outputs the data and the data is stored in the storage device 902. In storage of data such as a calculation result, the data may be outputted to the volatile storage device, or may be outputted to the auxiliary storage device via the volatile storage device.

DESCRIPTION OF THE REFERENCE CHARACTERS 1 control unit (control device for rotating machine)
2 DC power supply
3 rotating machine
4, 4a, 4b relay
5, 5a, 5b smoothing capacitor
6 voltage calculation means
7a, 7b voltage application means
13 post-relay voltage detection means
14 relay failure determination means
16 control command generation means
20aU, 20aV, 20aW, 20bU, 20bV, 20bW switching element of upper arm
21aU, 21aV, 21aW, 21bU, 21bV, 21bW switching element of lower arm
92 torque detection means
100 electric power steering control device
U1, U2, V1, V2, W1, W2 winding
M1 first winding set
M2 second winding set
C control command
V1*, V2* voltage command vector
ST torque detection signal
TR assist torque

The invention claimed is:

1. A control device for a rotating machine having a stator including a first winding set and a second winding set, the control device comprising:
   a relay for supplying or interrupting current from a DC power supply;
   a capacitor for suppressing variation in current supplied from the DC power supply;
   control command generator for generating a first control command that specifies current to flow through the first winding set, and a second control command that specifies current to flow through the second winding set;
   voltage calculator for calculating a first voltage command from the first control command and calculating a second voltage command from the second control command;
   first voltage energizer for applying voltage to the first winding set on the basis of the first voltage command; and
   second voltage energizer for applying voltage to the second winding set on the basis of the second voltage command, wherein
   electric discharge control for electric charge of the capacitor is performed while torque generated by current flowing from the capacitor to the first winding set and torque generated by current flowing from the capacitor to the second winding set are cancelled out with each other,
   wherein the first control command and the second control command are a first current command and a second current command in a rotating two-axis coordinate system, respectively, and the first current command and the second current command have phases opposite to each other.

2. The control device for the rotating machine according to claim 1, wherein
   d-axis current commands and q-axis current commands in the first current command and the second current command are not zero.

3. The control device for the rotating machine according to claim 1, wherein
   in the first current command and the second current command, d-axis current commands are zero and q-axis current commands are not zero.

4. The control device for the rotating machine according to claim 1, wherein
   in the first current command and the second current command, d-axis current commands are not zero and q-axis current commands are zero.

5. The control device for the rotating machine according to claim 1, wherein
   while the rotating machine is rotating, the voltage calculator performs electric discharge control for the capacitor when copper loss due to current flowing through the winding set that generates torque in a direction opposite to the rotation is greater than regenerative power due to the rotation of the rotating machine.

6. The control device for the rotating machine according to claim 1, further comprising rotation speed detector for detecting a rotation speed of the rotating machine, wherein
   electric discharge control is performed when the rotation speed of the rotating machine is smaller than such a rotation speed that decrease in electrostatic energy of the capacitor due to copper loss during the electric discharge control is equal to increase in electrostatic energy of the capacitor due to regeneration.

7. The control device for the rotating machine according to claim 1, wherein
   while the rotating machine is rotating, the control command generator switches phases of the first current command and the second current command therebetween during electric discharge of the capacitor.

8. The control device for the rotating machine according to claim 1, wherein
   the capacitor comprises a first capacitor corresponding to the first winding set and a second capacitor corresponding to the second winding set,
   the first capacitor is connected in parallel to the first voltage energizer and is subjected to electric discharge control by current flowing to the first winding set, and
   the second capacitor is connected in parallel to the second voltage energizer and is subjected to electric discharge control by current flowing to the second winding set.

9. The control device for the rotating machine according to claim 1, wherein
   when one of the first winding set and the second winding set is abnormal, a d-axis current command in the current command for the normal winding set is set to be not zero, and a q-axis current command in the current command for the normal winding set is set to zero.

10. The control device for the rotating machine according to claim 9, wherein
    when one of the first winding set and the second winding set is abnormal, the d-axis current command in the current command for the normal winding set is set to a positive value.

11. The control device for the rotating machine according to claim 9, wherein
    the control command generator sets the d-axis current command in the current command for the normal winding set so as to cause torque generated by current flowing through the normal winding set to be equal to or smaller than mechanical loss in the rotating machine and a mechanism that connects the rotating machine.

12. The control device for the rotating machine according to claim 1, wherein
the voltage calculator performs the calculation with an angle of the rotating machine set to be constant during execution of the electric discharge control.

13. A control device for a rotating machine having a stator including a first winding set and a second winding set, the control device comprising:
a relay for supplying or interrupting current from a DC power supply;
a capacitor for suppressing variation in current supplied from the DC power supply;
control command generator for generating a first control command that specifies current to flow through the first winding set, and a second control command that specifies current to flow through the second winding set;
voltage calculator for calculating a first voltage command from the first control command and calculating a second voltage command from the second control command;
first voltage energizer for applying voltage to the first winding set on the basis of the first voltage command; and
second voltage energizer for applying voltage to the second winding set on the basis of the second voltage command, wherein
electric discharge control for electric charge of the capacitor is performed while torque generated by current flowing from the capacitor to the first winding set and torque generated by current flowing from the capacitor to the second winding set are cancelled out with each other, wherein
the first voltage command and the second voltage command are voltage commands in a rotating two-axis coordinate system and have phases opposite to each other.

14. The control device for the rotating machine according to claim 13, wherein
in a case where a phase difference between current flowing through the first winding set and current flowing through the second winding set is $n\pi/3$, n being an integer not less than 0, if
a voltage command for A phase in the first voltage command is Va,
a voltage command for B phase in the first voltage command is $-$Va,
a voltage command for C phase in the second voltage command is $-$Va, and
a voltage command for D phase in the second voltage command is Va.

15. The control device for the rotating machine according to claim 13, wherein
in a case where a phase difference between current flowing through the first winding set and current flowing through the second winding set is $(\pi/6+n\pi/3)$, n being an integer not less than 0, if a voltage command for A phase in the first voltage command is Va and a voltage command for B phase in the first voltage command is $-$Va,
a voltage command for C phase, in the second voltage command, which coincides with a synthetic vector of the voltage command for A phase and the voltage command for B phase in the first voltage command is $-2Va/\sqrt{3}$, and voltage command values for D phase and E phase in the second voltage command are $Va/\sqrt{3}$.

16. The control device for the rotating machine according to claim 13, wherein
in a case where a phase difference between current flowing through the first winding set and current flowing through the second winding set is $(\pi/6+n\pi/3)$, n being an integer not less than 0, if a voltage command for A phase in the first voltage command is Va and a voltage command for B phase in the first voltage command is $-$Va,
a voltage command for C phase, in the second voltage command, which coincides with a synthetic vector of the voltage command for A phase and the voltage command for B phase in the first voltage command is $2Va/\sqrt{3}$, and
voltage commands for D phase and E phase in the second voltage command are $-Va/\sqrt{3}$.

17. The control device for the rotating machine according to claim 14, wherein
the first voltage energizer turns on a switching element for A phase among switching elements of upper arms thereof, turns on a switching element for B phase among switching elements of lower arms thereof, and turns off switching elements other than A phase of the switching elements of the upper arms and B phase of the switching elements of the lower arms, and
the second voltage energizer turns on or off switching elements thereof so as to obtain a voltage vector having a phase opposite to that of a voltage vector obtained by the first voltage energizer.

18. The control device for the rotating machine according to claim 17, wherein
in a case where the first voltage energizer or the second voltage energizer has a phase in which open-circuit failure occurs in at least one of switching elements of an upper arm and a lower arm thereof, the first voltage energizer or the second voltage energizer turns off the switching element of the arm that has the same phase as and is located on a side opposite to the arm having the switching element in which the open-circuit failure occurs.

19. The control device for the rotating machine according to claim 1, further comprising relay controller for controlling opening and closing of the relay, wherein
the electric discharge control is performed in a state in which the relay is opened.

20. The control device for the rotating machine according to claim 1, further comprising relay failure determinator for performing determination as to failure of the relay on the basis of voltage of a load-side contact of the relay.

21. The control device for the rotating machine according to claim 20, wherein
the relay failure determinator performs determination as to failure of the relay after electric discharge control for the capacitor.

22. The control device for the rotating machine according to claim 1, wherein
the voltage calculator performs electric discharge control for the capacitor intermittently at predetermined time intervals.

23. The control device for the rotating machine according to claim 1, wherein
the voltage calculator performs electric discharge control for the capacitor at a time of shutting down.

24. The control device for the rotating machine according to claim 1, further comprising:
  first switching signal generator for generating a first switching signal on the basis of the first voltage command and outputting the first switching signal to the first voltage energizer; and
  second switching signal generator for generating a second switching signal on the basis of the second voltage command and outputting the second switching signal to the second voltage energizer.

25. An electric power steering control device comprising:
  the control device for the rotating machine according to claim 1;
  torque detector for detecting steering torque of a vehicle and transmitting a torque detection signal to the control device for the rotating machine; and
  a rotating machine which is controlled by the control device for the rotating machine and generates assist torque for assisting the steering torque.

* * * * *